United States Patent
Liashenko et al.

(10) Patent No.: US 9,971,696 B2
(45) Date of Patent: May 15, 2018

(54) FILE-BASED CLIENT SIDE CACHE

(71) Applicant: Dell Products L.P., Round Rock, TX (US)

(72) Inventors: Sergii Liashenko, Mountain View, CA (US); Puneet Kaushik, Fremont, CA (US); Rushikesh P. Patil, Sunnyvale, CA (US); Satya Mylvara, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 14/856,968

(22) Filed: Sep. 17, 2015

(65) Prior Publication Data

US 2016/0342519 A1    Nov. 24, 2016

Related U.S. Application Data

(63) Continuation-in-part of application No. 14/719,248, filed on May 21, 2015, now Pat. No. 9,665,283.

(51) Int. Cl.
| | |
|---|---|
| *G06F 12/0871* | (2016.01) |
| *G06F 12/128* | (2016.01) |
| *G06F 12/1009* | (2016.01) |
| *G06F 17/30* | (2006.01) |

(52) U.S. Cl.
CPC ...... *G06F 12/0871* (2013.01); *G06F 12/1009* (2013.01); *G06F 12/128* (2013.01); *G06F 17/30132* (2013.01); *G06F 17/30324* (2013.01); *G06F 2212/314* (2013.01); *G06F 2212/604* (2013.01)

(58) Field of Classification Search
None
See application file for complete search history.

(56) References Cited

U.S. PATENT DOCUMENTS

| | | | | |
|---|---|---|---|---|
| 5,740,370 A | * | 4/1998 | Battersby | G06F 17/30132 707/999.01 |
| 2013/0318318 A1 | * | 11/2013 | Nemoto | G06F 11/1451 711/162 |
| 2015/0199375 A1 | * | 7/2015 | Prahlad | G06F 17/30212 707/610 |

* cited by examiner

*Primary Examiner* — Adam M Queler
*Assistant Examiner* — Dustin Bone
(74) *Attorney, Agent, or Firm* — Baker Botts L.L.P.

(57) ABSTRACT

A file-system filter driver is attached to each cache volume containing a cache and a source volume containing a source file. The file-system filter driver intercepts requests and may redirect the requests to the cache. The redirection may be based on metadata information corresponding to the file or folder associated with a given request. Redirection to the cache prevents an application or user from directly accessing or modifying the source volume, which may be shared among multiple client devices. Redirecting requests to the cache also permits user-specific modifications to be stored in the cache. A merged view of the source volume and the cache may then be presented to the user or an application, reflecting the user-specific modifications without affecting the source volume.

17 Claims, 3 Drawing Sheets

FILE-BASED CLIENT SIDE CACHE

PRIORITY

This application is a continuation-in-part under 35 U.S.C. § 120 of U.S. patent application Ser. No. 14/719,248, filed May 21, 2015.

TECHNICAL FIELD

This disclosure relates generally to information handling systems and, more particularly, to providing layered resources to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

In a streaming or layering environment where instead of a local hard drive clients use virtual disks backed by data files stored on a remote server, network performance may be a bottleneck for the information handling system. In these environments, the paging and non-memory-cached disk input/output (I/O) may eventually go over the network and thus may cause significant performance degradation of the information handling system and may lead to network congestion. For example, a client information handling system may run applications that produce intensive disk I/O or use a significant amount of virtual memory which may cause network congestion.

To overcome certain network traffic issues or network congestion, existing solutions may utilize a local cache on the device, either RAM-based or disk-based. The cache is block-based, that is, it is based on the physical block address and is not file-system based. One advantage of block-based caches is that they can be implemented via a simple storage filter driver that checks and handles all disk I/O operations. These I/O operations refer to a disk block address and have no mapping to a file. However, block-based cache has to be consistent with the associated virtual disk. If the virtual disk is updated, then all local caches on all the clients have to be deleted. All the user data, applications settings, user-specific configurations, etc. will be lost.

SUMMARY

In one embodiment, a method of implementing a cache in a layering environment comprises loading a file-system filter driver, attaching the file-system filter driver to each cache volume containing the cache and a source volume. The file-system filter driver intercepts a first request where the first request is an open request and comprises one of a create-file request or an open source file request. The first request is redirected to the cache. In response to the first request, a cached file in a cached folder in the cache is created. Creating the cached file comprises setting a size and a valid data length of the cached file. A handle to the cached file is returned.

In other embodiments, other types of requests may also be intercepted. In one embodiment, the file-system filter driver intercepts a write-file request. The write-file request is redirected to the cache. A page bitmap with a modification status of a source file associated with the write-file request is updated so that it is known that modifications associated with the source file have been made.

In another embodiment, the file-system filter driver intercepts an open cached file request. The open cached file request is redirected to the cache. In response to the open cached file request, a source path is obtained, wherein the source path comprises a location of at least one of a source file and a source folder of the source volume corresponding to the cached file. The source path is opened. For example, the source path may be a path to a folder and the folder is opened or the source path may be a path to a specific file and that file is opened.

In another embodiment, a rename request may be intercepted by the file-system filter driver, wherein the rename request comprises one of renaming the cached file or renaming the cached folder. The rename request is redirected to the cache. If a rename request for a cached file is received, the cached file is renamed. If a rename request for a cached folder is received, the cached folder is renamed. The source path metadata associated with the rename request is saved. For example, if the rename request is for a cached folder then the metadata associated with the cached folder is saved and if the rename request is for the cached file then the metadata associated with the cached file is saved. Likewise, the source volume metadata corresponding to the either the cached file or the cached folder associated with the rename request is updated. The source volume metadata is indicative of a rename of either the cached file or the cached folder associated with the rename request. For example, for a rename request of a cached folder, the source volume metadata associated with the cached folder is updated and for a rename request of a cached file, the source volume metadata associated with the cached file is updated.

In another embodiment, the file-system filter driver intercepts a delete request, where the delete request comprises one of deleting the cached file or deleting the cached folder. The delete request is redirected to the cache. The cached file or the cached folder associated with the delete request is deleted. For example, if the delete request is for a cached filed, the cached file is deleted and if the delete request is for a cached folder, the cached folder is deleted. The metadata entry associated with the deleted cached file or the deleted cached folder is deleted. For example, if the delete request if for a cached file, the metadata entry associated with the cached file is deleted and if the delete request if for a cached folder, the metadata entry associated with the cached folder is deleted. The source volume metadata associated with the deleted cached file or the deleted cached folder is updated. For example, if the delete request is for a cached file, the source volume metadata associated with the cached file is updated and if the delete request is for the cached folder, the source volume metadata associated with the cached folder is updated. The source volume metadata is indicative of the deletion of the cached file or the cached folder associated with the delete request.

In one embodiment, one or more computer-readable non-transitory storage media embodying logic is operable when execute to perform any one or more of the described embodiments. In one embodiment, the one or more computer-readable non-transitory storage media embodying logic is further operable to receive, in response to a query directory request, cache structure information from the cache and source volume structure information from the source volume corresponding to the cache and to provide, in response to receiving the cache file structure information and source volume structure information, a merged view of the cache structure information and the source volume structure information.

In another embodiment, an information handling system comprises one or more processors and a memory coupled to the processors where the memory comprises instructions executable by the processors and where the processors are operable when executing the instructions to perform any one or more of the described embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Implementing a local cache that is file-system based leverages the local hard disk for storage to prevent network congestion. A file-based local cache may also solve some of the issues associated with a block-based cache. For example, if some files are changed at the virtual disk or source volume in a file-system based local cache, only those files will be removed from the local cache. Operating system updates may be installed, applications may be installed or updated, etc. without requiring a rebuild of the local cache and user data and configurations are preserved.

The present invention provides a file-system filter driver that attaches to a volume device object of each cached volume of the virtual disk and each local disk volume used as a cache. The file-system filter driver is loaded at boot time, before the operating system opens any handles on the cached volumes. The file-system filter driver intercepts I/O operations or requests to the underlying file system and redirects create-file requests to the source (cached) volume and filters I/O requests sent to redirected files. Caching is configured per volume with one cache volume used for several source volumes. Each source volume may have its data stored in a separate folder on the cache volume. Particular embodiments are best understood by reference to FIGS. 1-4, wherein like numbers are used to indicate like and corresponding parts.

Figure 1:
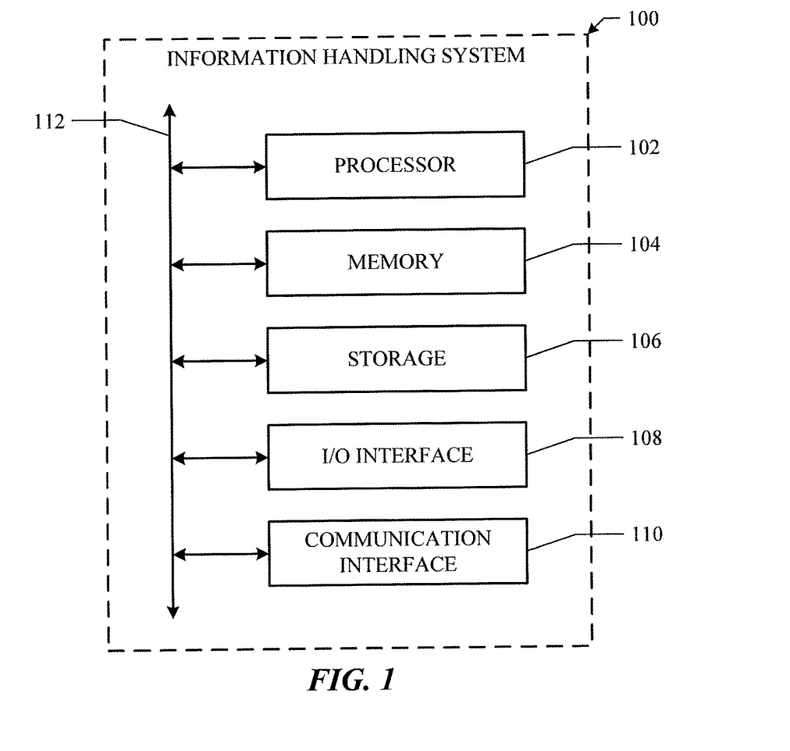
FIG. 1 is a block diagram of selected elements of an information handling system.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
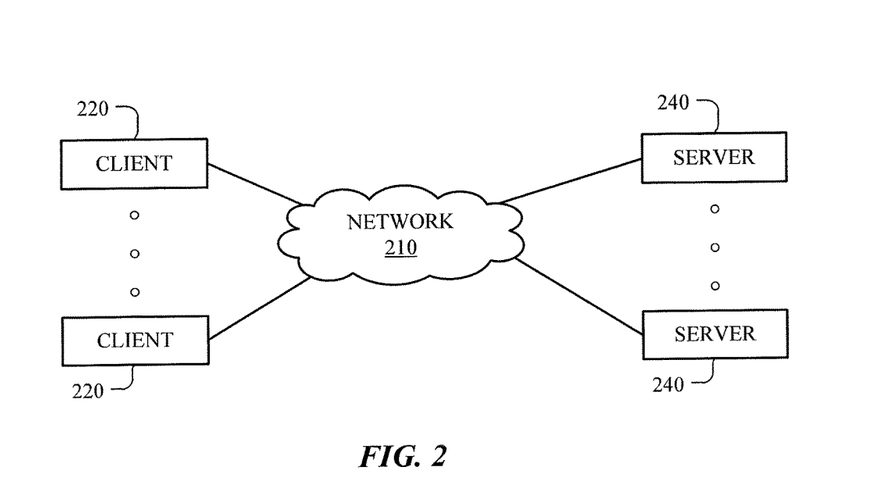
FIG. 2 is an example of a network environment.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

A system and method for providing layered resources to an information handling system is disclosed herein. A layer is a container or collection of data or resources. The data or resources may comprise executable code, such as an operating system or user application. The data or resources may comprise configuration data for an information handling system, such as registry settings in a Microsoft Windows environment, or other data structures used to store configuration settings, such as text files, XML files, and the like. The data or resources may comprise files in any format, including but not limited to, text files, HTML files, or proprietary files such as Microsoft Word ".DOC" or ".DOCX" files or Microsoft Excel ".XLS" spreadsheets.

Figure 3:
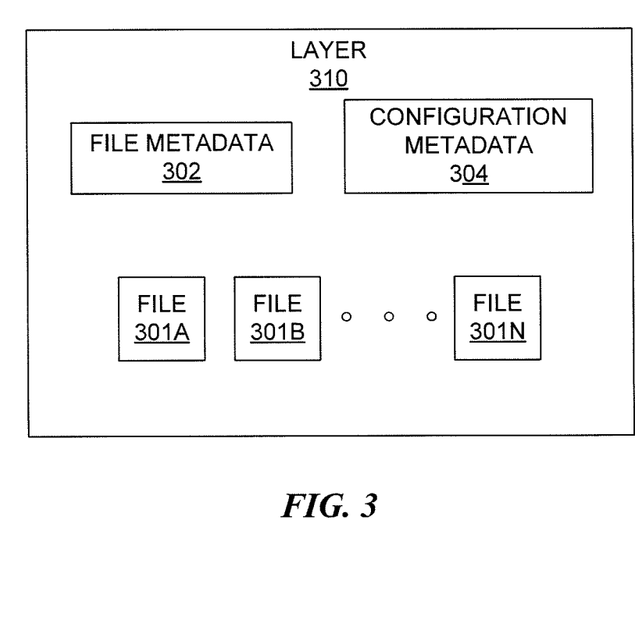
FIG. 3 is an example of a layer.

FIG. 3 illustrates a particular embodiment of a layer 310. In this embodiment, layer 310 contains one more or more files or resources 301A-301N associated with an application, such as Microsoft Word, Microsoft Excel, Microsoft Outlook, Adobe Acrobat, or the FireFox web browser. The files or resources 301A-301N may comprise executable code, non-executable data (e.g., images, help files, templates, et cetera), or a combination of executable and non-executable data. The layer may also contain configuration information necessary for the application to run on the information handling system. For example, for an application executable by a Microsoft Windows operating system, the application may require one or more registry settings. Therefore, the layer may store the registry keys and values associated with the application. The registry keys and values may be stored as metadata. In particular embodiments, the registry keys and values may be stored in a registry hive in the layer.

In particular embodiments, the layer comprises an operating system image, and files 301A-301N comprise the executable and non-executable files associated with a particular operating system. For example, the files may comprise the bootloader, the kernel, hardware drivers, software drivers, and other files associated with the operating system. The layer may also contain configuration information necessary for the operating system, such as environment settings and network configuration settings.

In particular embodiments, a layer may contain data or resources for more than one application or operating system. For example, an organization may create an "Accounting Department" layer that contains all the files, resources, or configuration settings necessary for applications deployed to users in the organization's accounting department. Continuing with this example, the accounting department layer may contain an image of Microsoft Excel, Microsoft Word, and other applications typically deployed to users in the accounting department, all in a single layer. In particular embodiments, the layer may also contain files, resources, or configuration settings for one or more operating systems.

A layer may also contain metadata that describes the contents of the layer. Any suitable data structure, such as an XML file, a hash table, a tree data structure, an array, a linked list, or a Microsoft registry hive, may be used to store the metadata. The layer may contain one or more data structures to store the metadata. Referring to the particular embodiment depicted in FIG. 3, a layer 310 comprises file metadata 302 and configuration metadata 304. File metadata 302 may comprise one or more data structures identifying the files 301A-301N stored in layer 310, identify one or more logical blocks associated with the files, or identify one or more logical-to-physical mappings of the files. Configuration metadata 304 may store configuration settings associated with the layer, or identify where configuration settings associated with the layer are stored. In particular embodiments, registry key and value pairs are stored in configuration metadata 304. In particular embodiments, the configuration metadata is stored in a Microsoft registry hive.

No particular storage medium is required for storing a layer and the associated data or resources. By way of example and not by way of limitation, layer 310 may be stored on a hard disk drive (e.g., a partition the hard disk drive), a virtual disk, a RAM disk, a USB storage device, a Flash storage device, a DVD (digital versatile disc), or any other suitable storage medium. The storage medium may be local to the information handling system. In particular embodiments, the storage medium may be remote from the information handling system. For example, the storage medium may comprise a network file share (e.g., an Network File System share, an NTFS/SMB file share), a block-based network share (e.g., storage area network using Fibre-Channel or iSCSI), or a cloud storage service. In a particular embodiment, a layer may be stored on a streaming virtual disk (vDisk). By way of example and not by way of limitation, an implementation of a streaming vDisk is available from Dell Inc. In particular embodiments, a layer may comprise a folder or directory on a storage medium where the data and resources associated with the layer are stored. For example, a layer may comprise a partition of a streaming Virtual Disk (vDisk) where all of the data and resources associated with the layer are stored.

In particular embodiments, a layer may be stored remotely from the information handling system. If the information handling system maintains connectivity to the remote storage medium, the layer may remain remotely stored from the information handling system. In particular embodiments, the layer (or portions of the layer) may be cached or staged to a storage medium local to the information handling system. For example, caching or staging a layer locally may permit increased performance during runtime or permit offline usage of the layer. The layering system and method disclosed herein does not require that the one or more layers provided to the information handling system be stored on a single type of storage medium or at a single location. By way of example and not by way of limitation, an information handling system may be provided with access to a first layer that is stored on a local storage medium, and a second layer that is stored on a remote storage medium.

In particular embodiments, the layering system comprises a layering client, a layering file-system filter driver (LFFD), and a layering registry filter driver (LRFD) provided for the information handling system.

In particular embodiments, the layering client is responsible for managing the mounting of layers. The layering client may determine which layers are to be mounted based upon the identity of the user, a role associated with the user, an identifier of the information handling system, a geographic location, or any other criteria that may be relevant to provisioning software to an information handling system. Layers may be mounted at boot time (such as when a layer is used to provide the operating system), during a log-on process, or dynamically (such as when a user clicks an icon associated with a layer resource). In particular embodiments, a layer is mounted as a file system and is assigned an available drive letter. The drive may be hidden from the user to prevent a user from directly accessing or modifying the contents of the layer. When more than one layer is mounted, the layering client may assign a priority or ordering to the mounted layers. The assigned priority or ordering may be used to resolve conflicts between layers, such as when more than one mounted layer contains a similarly named resource.

In particular embodiments, the criteria or rules to mount a layer are decoupled from the client device where layers are actually mounted. For example, the layering client may send an identifier associated with the current user and an identifier associated with the client device to a management server. The management server is responsible for applying the criteria or rules to determine which layers the client device should mount. The rules or criteria may comprise any combination of user name, a group associated with the user, time of the day, type of device (laptop/PC/Tablet), or any other suitable criteria.

In particular embodiments, the layering client may configure the other layering drivers provided for the information handling system. For example, the layering client may notify the layering drivers when a layer has been mounted or dismounted. The layering client may also be used to alter the operating state of the layering drivers. For example, the layering drivers may have multiple operating states, such as a "normal" or "runtime" state, and an "install" or "create layer" state.

In particular embodiments, a method of creating a layer is disclosed herein. The layering client may receive a notification to create a layer. The notification may be received from a user interface provided on the information handling system or may be received from a remote information handling system. The layering client may determine a target storage location on a suitable storage medium from the notification, or by prompting a selection by a user of the information handling system. The layering client may reformat the target storage location if appropriate. The layering client may create a file metadata, a configuration metadata, or both on the target storage location. If any other layers are mounted, the layering client may dismount the other layers. The layering client mounts the target storage location as a layer. The layering configures the LFFD and the LRFD, if an LRFD is present, to operate in an "install" or "create layer" state. While in the "install" state, a user may install applications using standard application installer technology, and the installed applications will be created on the newly created layer. Once all applications have been installed, the layering client may receive a notification that installation is complete and that the layering system should be put back into a "normal" or "runtime" state. At this point, the layering client may dismount the newly created layer. The layering client configures the LFFD and the LRFD, if an LRFD is present, to operate in a "normal" or "runtime" state.

In particular embodiments, the layering file-system filter driver (LFFD) may be loaded onto a file system stack of the information handling system's operating system. The LFFD may register with the OS to receive notifications for all file operations (e.g. create, open, close, read, write, rename, delete, directory enumeration, etc.). The LFFD is operable to allow a file operation to pass-through to the file system, or the LFFD may modify a file operation. By way of example and not by way of limitation, the LFFD may modify a file operation by blocking the operation, replicating the operation, redirecting the operation, or performing one of the operations described herein.

In the normal or runtime state, the LFFD examines each file operation and determines whether the file operation must be redirected or modified to make use of a file contained in a mounted layer. This determination may be made by performing a path lookup against metadata describing the files contained in the mounted layers. For example, the LFFD may load the file metadata for a layer when it is mounted, and then use the file metadata to perform a path lookup.

In particular embodiments, a method for handling a file open operation by the LFFD is disclosed. The LFFD receives a notification of a file open operation, and identifies the target file from the notification. Next, the LFFD may perform a path lookup against the file metadata of a first mounted layer. If there is no match, the LFFD may move to the next mounted layer and perform a path lookup against the file metadata of the next mounted layer recursively until there are no other mounted layers or a match is found. If there are no other mounted layers, the LFFD will allow the file open operation to be handled by the file system. When a path lookup results in a match, the LFFD looks for a file described by file metadata. If the file is found in the mounted layer, the LFFD modifies the file open operation by redirecting the target of the file open operation to point to the file found in the mounted layer. If no file is found in the mounted layer, the LFFD proceeds to perform a path lookup against the next mounted layer and so on. The order in which the LFFD checks the file metadata of each mounted layer may be determined by a priority or ordering assigned to the layers.

For example, assume a layer is mounted as drive E: and the layer contains a file "Foo.txt" that is associated with the path "\Program Files\App\". If the LFFD receives a notification for a file open operation that specifies a target of "C:\Program Files\App\Foo.txt", the LFFD will perform a path lookup against the file metadata for all mounted layers. In this example, the LFFD will match the path "\Program Files\App\", and determine that the file operation may be associated with the layer mounted at E: Next, the LFFD will check to see if there is a file "Foo.txt" in the mounted layer. In this example, the LFFD will locate the file "Foo.txt". Having made the determination that the file operation targets a file associated with a mounted layer, the LFFD will redirect the file open operation such that the file located at "E:\Program Files\App\Foo.txt" is opened instead of a file located at the same path on the C: drive, even if such a file existed. If the LFFD matches the path to a mounted layer, but the LFFD does not locate the described file within the layer, then the LFFD will allow the file operation to pass to the file system of the operating system for normal handling.

In particular embodiments, a method for handling a file directory enumeration operation by the LFFD is disclosed. The LFFD receives a notification of a file directory enumeration operation, and identifies the target file directory. For each mounted layer, the LFFD creates a file directory enumeration operation that targets the mounted layer. The results returned by the file directory enumeration operation for each mounted layer are merged together with the result of a file directory enumeration operation that is allowed to pass-through to the file system. Before returning the results, the LFFD will filter out duplicate files such that only the file associated with the highest priority layer is returned.

For example, assume there is a first layer mounted at E: a second layer mounted at F:, and a third layer mounted at G:. When the LFFD receives a notification of a file directory enumeration operation targeting "C:\Program Files\App\", the LFFD will send file directory enumeration operations targeting "E:\Program Files\App\", "F:\Program Files\App\", and "G:\Program Files\App\". The results of these operations are merged with the result of a file directory enumeration operation that is passed-through to the file system targeting "C:\Program Files\App\". To the user or an application, the results appear to only come from a single directory while the results were generated by combining the files in four different file directories. If there are two or more files with the same name across the four different file directories, the LFFD will filter out the duplicate file names according to the priority or ordering assigned to the layers.

In particular embodiments, a method for handling a file directory enumeration operation by the LFFD using a file directory query hook is disclosed. The LFFD makes use of a directory query hook provided by file system instead of creating separate file directory enumeration operations that target each mounted layer. First, the LFFD receives a file directory enumeration operation. The LFFD identifies the highest priority layer, redirects the file directory enumeration operation to the highest priority layer, sets a flag that indicates that more results will be available, and records in metadata the next layer to be queried. When the query is returned from the highest priority layer, the initiating process receives the results, and the set flag triggers the initiating process to resubmit the file directory enumeration operation. The LFFD recognizes that the file directory enumeration operation is a continuation of a prior request, checks the metadata to identify the next layer to be queried, redirects the operation to the next layer, sets the flag indicating that more results are available, and updates the metadata to identify the next layer to be queried. The process continues until there are no more layers to check, in which case, the operation is passed-through to the file system. During this process, the LFFD tracks the results returned by each operation, and filters duplicate files from subsequent queries to prevent multiple files with the same name appearing in the directory view.

In particular embodiments, it may be unnecessary for the LFFD to modify the behavior of other file operations if the remaining types of file operations make use of a file handle. For example, if a file open operation must be performed before a read file operation, a write file operation, or a close file operation, no modification to these file operations are necessary so long as the file operations make use of a file handle returned from a file open operation. If the target file is associated with a file in a layer, then the file handle returned by the file open operation will have been redirected to the layer resource by the LFFD. Continuing the previous example, when a file open operation targeting "C:\Program Files\App\Foo.txt" is handled by the LFFD, the LFFD returns a file handle that points to the "Foo.txt" file at its location in the layer mounted at the E: drive. Any subsequent file operations using the file handle will make use of the file located in the layer automatically.

In particular embodiments, the LFFD may perform the path lookups described herein using cached metadata. In a particular embodiment, the metadata cache is created by loading metadata stored in a layer when the layer is first mounted. The cached metadata can be stored as a hash table where paths are used as the hash key or as in-memory search tree.

In another particular embodiment, the metadata cache is implemented using Microsoft Windows registry hives. In this embodiment, the file metadata for each layer is stored in a registry hive in each layer. When the layer is mounted, the LFFD locates the registry hive containing the file metadata for the layer, and loads the registry hive into the registry. The LFFD performs path lookups by querying each layer's registry hive loaded into the registry. When a the layer is dismounted, the LFFD unloads the registry hive from the registry.

In particular embodiments, a method for handling a file create operation by the LFFD operating in an "install" or "create layer" mode is disclosed. The LFFD receives a notification of a file create operation, and determines the target path. The LFFD redirects the file create operation to a destination location on the storage medium for the mounted layer that is in an "install" state. The LFFD may update the file metadata associated with the mounted layer to include information concerning the target path and the destination location to facilitate a path lookup. The LFFD may return a file handle pointing to the destination location to the calling process.

For example, assume that the layer in an "install" state is mounted as E: While the layering system is in install mode, the user runs an installer package for an application. The installer package attempts to create a file at the target path "C:\Program Files\App\Foo.txt". The LFFD receives a notification of the file create operation, and redirects the file create operation to the destination path "E:\Program Files\App\Foo.txt". The LFFD may update the file metadata to associate the target path "\Program Files\App\Foo.txt" with the destination path within the layer "\Program Files\App\Foo.txt". At the completion of the file create operation, the installer package receives a file handle that points to the file stored at "E:\Program Files\App\Foo.txt".

In particular embodiments, a method for handling a file modify operation by the LFFD operating in an "install" or "create layer" mode is disclosed. The LFFD receives a notification of a file modification operation, and determines the target path. The LFFD redirects the file create operation to a destination location on the storage medium for the mounted layer that is in an "install" state. If the file does not exist on the storage medium for the mounted layer, the file may be copied from the target path to the mounted layer, and then apply the modification. The LFFD may update the file metadata associated with the mounted layer to include information concerning the target path and the destination location to facilitate a path lookup. The LFFD may return a file handle pointing to the destination location to the calling process.

If the information handling system is running an operating system that uses a registry for storing configuration settings (for example, a Microsoft Windows operating system), then a layering registry filter driver (LRFD) may be provided. The LRFD may register with the OS to receive a notification for all registry operations (e.g. create key, get key value, delete key, delete key value, enumerate keys, etc.). The layering registry filter driver can allow a registry operation to pass-through to the OS's registry, or block, replicate or redirect the registry operation to target configuration metadata in a mounted layer. In the normal or runtime state, the LRFD examines each registry operation and determines whether the registry operation must be redirected or modified to make use of a registry key or value associated with a mounted layer. This determination may be made by performing a lookup against the configuration metadata stored in the mounted layers.

In particular embodiments, a method for handling a registry modification or retrieval operation by the LRFD is disclosed. The LRFD receives a notification of a registry modification or retrieval operation (e.g., get registry key value or set registry key value), and identifies the target key from the notification. Next, the LRFD queries the configuration metadata for each mounted layer in the order of priority assigned to the mounted layers. When the first match is found, the LRFD redirects the registry operation to the configuration metadata in the mounted layer associated with the first match, and returns the result to the calling process. If there is no match, the LRFD allows the registry operation to pass-through to the registry for normal handling.

For example, assume there is a first layer mounted at E:, a second layer mounted at F:, and a third layer mounted at G:. Also assume that the second layer's configuration metadata contains a key and value associated with the registry path "HKEY_LOCAL_MACHINE\SOFTWARE\Vendor\Key1", and assume that the registry also contains a key and value at the same path. When the LRFD receives a notification of a registry get key value operation targeting "HKEY_LOCAL_MACHINE\SOFTWARE\Vendor\Key1", the LRFD will query configuration metadata for the first mounted layer and not find a match, the LRFD will query configuration metadata for the second mounted layer and find a match. At this point, the LRFD will redirect the registry operation to the configuration metadata of the second layer, and the calling process will receive the value stored in the configuration metadata of the second layer. Continuing with this example, assume that the registry path does not exist in the second mounted layer. With this modification, the LRFD would query the configuration data of all three mounted layers, and not find a match. At this point, the LRFD would allow the registry operation to be handled by the registry.

In particular embodiments, a method for handling a registry enumeration operation by the LRFD is disclosed. The LRFD receives a notification of a registry enumeration operation, and identifies the target registry path from the notification. Next, the LRFD queries the configuration metadata for each mounted layer in the order of priority assigned to the mounted layers. For each queried configuration metadata, the LRFD gathers and merges all of the registry keys and values associated with the target path. If there are registry keys that are the same in more than one configuration metadata or the registry, the LRFD filters out the registry keys and values associated with the lower priority layers and the registry. The combined results are returned to the calling process.

In particular embodiments, a registry operation that requires the creation of new keys or trees while the LRFD is in a "normal" or "runtime" state is allowed to pass-through to the registry. Although this disclosure describes particular embodiments of methods for handling registry operations by the LRFD, the disclosure contemplates other embodiments of methods for handling registry operations by the LRFD.

In particular embodiments, a method for handling a registry key create operation by the LRFD operating in an "install" or "create layer" state is disclosed. The LRFD receives a notification of a registry create operation (e.g., create registry key), and identifies the target key from the notification. Next, the LRFD redirects the registry operation to the configuration metadata in the mounted layer that is in an "install" state.

In particular embodiments, the configuration metadata is registry hive stored in the layer. In such an embodiment, redirecting the registry operation comprises redirecting the registry operation from the registry to the registry hive stored in the layer.

For example, assume that the layering system is in an "install" or "create layer" state. While an application installer executes, the installer package attempts to create a new key at target registry path "HKEY_LOCAL_MACHINE\SOFTWARE\Vendor\Key1" and value "Value1". The LRFD receives a notification of the registry create key operation, and redirects the registry create key operation to the destination path "HKEY_LOCAL_MACHINE\SOFTWARE\Vendor\Key" in the registry hive stored in the layer that is mounted in the "install" state. The installer application receives a notification that the registry operation was successful, even though the new key and value were stored in a registry hive stored in the mounted layer as opposed to the registry.

In particular embodiments, a method for handling a registry key modification operation by the LRFD operating in an "install" or "create layer" state is disclosed. The LRFD receives a notification of a registry key or value modification operation (e.g., set key value), and identifies the target key from the notification. Next, the LRFD redirects the registry modification operation to the configuration metadata in the mounted layer that is in an "install" state. If the target key or entry does not already exist in the configuration metadata (e.g. the registry key being modified was previously created in the registry), the target key will be created in the configuration metadata and the modification applied. The calling process or application receives a notification that the registry operation was successful, even though the modification was not applied to the registry.

For example, assume that there is a pre-existing registry key in the registry at the registry path "HKEY_LOCAL_MACHINE\SOFTWARE\Vendor\Key1" that has a value "Value1". After the layering system switches to an "install" or "create layer" state, an application attempts to change the data of the value associated with a key. The LRFD will receive a notification of the registry modification operation, and will redirect the change to the configuration metadata stored in the layer mounted in the "install" or "create layer" state. If the key does not already exist in the layer, the key is created and the data associated with the value is set to "Value2". If the key already exists in the layer, the data associated with the value is changed to "Value2". The data of the value associated with the key in the registry is left unmodified as "Value1". The calling process is notified that the operation was successful even though the registry was not modified.

In particular embodiments, the operating system of the information handling system does not provide or use a registry for configuration data. In such embodiments, the layering system comprises a layering client and a layering file-system filter driver (LFFD) provided for the information handling system.

In particular embodiments, a client device in a layering environment may include one or more virtual disks backed by corresponding virtual disk source volumes (e.g., storage devices on a remote server). The client device may further include a file-based local cache corresponding to one or more of the virtual disks such that all I/O requests are directed to the local cache, precluding direct access to the virtual disk source volume by the client device. A cached file or cached folder in the local cache may have a corresponding source file or source folder located in a virtual disk source volume. As described below in more detail, a cached file or a cached folder may be created as a copy in whole or in part of a source file or a source folder, respectively, and certain file and folder data may be retrieved from the source file or source folder.

In particular embodiments, a file-system filter driver ("FSFD") intercepts requests directed to the virtual disk and redirects the requests to the local cache. The FSFD may be loaded at boot time, before the operating system opens any handles for files or folders on the virtual disk source volume. Loading of the FSFD may include attaching the FSFD to one or more virtual disks and the local cache volumes corresponding to the virtual disks.

In particular embodiments, the FSFD may maintain metadata for files and folders of the virtual disk source volume and the local cache. File and folder metadata may be maintained in separate sets corresponding to the local cache and the virtual disk source volume. For example, the FSFD may maintain local cache metadata corresponding to cached files and folders and source volume metadata corresponding to source files and folders. Metadata corresponding to a particular file or folder may include, but is not limited to, the name, path information, and status of a file or folder. Regarding path information, metadata entries for cached files and folders may include cached file path information and a source file information.

In particular embodiments, metadata may include a state of a cached file or folder. For example, a cached file may be assigned one of a "source" state, a "split" state, and a "cache" state. A "source" state indicates that a cached file does not reflect any modifications from its associated source file. In certain embodiments, the FSFD may, in response to a read request directed to a cached file, return the requested data from its corresponding source file. A "split" state indicates that a cached file reflects some modifications to its corresponding source file and, as a result, the complete file data is split between the virtual disk source volume and the local cache. For example, unmodified portions of the file data may be stored as pages in the virtual disk source volume while modified portions of the file data may be stored as cached pages in the local cache. A "cache" state indicates cached files or folders located in the local cache without corresponding files or folders on the virtual disk source volume, or cached files or folders for which every page has been updated. In certain embodiments, the FSFD may allow all requests directed to files or folders having a "cache" state pass directly to the local cache.

A page bitmap or similar mapping may be used to track the status of a source file and any modifications captured in the cache such that the FSFD may refer to the page bitmap to determine how to redirect requests. If the FSFD receives a read request, for example, the FSFD may refer to the page bitmap to determine which pages of a source file associated with the read request have been modified. The FSFD may then redirect the read request to the cache to read modified pages or to the source volume to read unmodified pages as required. The page bitmap may be updated as requests are processed by the FSFD. If the FSFD receives a write request, for example, the FSFD sends the write request to the local cache. The FSFD then updates the status of the source file associated with the write-file request in the page bitmap to reflect that a modification has occurred.

In particular embodiments, requests intercepted by the FSFD may include create-file requests. When the FSFD intercepts a create-file request, the FSFD redirects the create-file request to the local cache where a cached file is created in a cached folder. After a cached file is created, the FSFD may return a handle to the cached file to the initiator of the create-file request.

Requests intercepted by the FSFD may also include open requests. An open request may be an open source file request or open cached file request. An open source file request is an open request in which the file requested to be opened is located in the source volume but does not yet have a corresponding cached file. In response to an open source file request, a cached file may first be created in the cache and the cached file's size, data length, or other attributes may be set to match those of the source file, even if the cached file is opened in a read-only mode. This may be required for certain file system caches, such as the Windows file system cache, which require proper tracking of file sizes. The FSFD may then process the open source file request by returning a handle to the cached file. The FSFD may also internally open the source file to provide data and file information.

In particular embodiments, the FSFD may intercept an open request that is an open cached file request. An open cached file request is an open request in which the file requested to be opened is a cached file. The cached file may be exclusive to the cache (for example, if the cached file was created in response to a create file request) or may be associated with a source file. An open cached file request may contain a cache path reflecting a location of a cached file in the cache volume. In response to an open cached file request, the FSFD returns a handle to the cached file. To the extent a source file corresponding to the cached file also exists, the source file may also be opened internally without returning a handle in order to, for example, read data pages that have not yet been copied to the cached file or obtain file information such as size and file attributes.

Because operations such as deleting, creating, and renaming files and folders are reflected only in the cache, the file and folder structure of the cache may differ from that of the virtual disk source volume. Accordingly, opening a source file or folder may require determining a source path corresponding to the cache path provided in the open request. Determining the source path may comprise examining metadata of the cache path's entries (for example, files and folders). Metadata for a particular cache path entry may include source path information describing the location of a source file or folder corresponding to the cache path entry. The source path information may be used to construct a source path that may then be validated by determining if the source path does not contain any entries that have been deleted, marked as renamed, or otherwise modified. If the source path is valid, the FSFD may use the source path to open the source file or folder corresponding to the cached file or folder. If the source path is determined to be invalid, the source file or folder is considered not to exist.

In certain embodiments, if both a cached file and a corresponding source file exist, the timestamps of the cached file and the source file may be compared. If the timestamp of the source file indicates that the source file is newer than the cached file, the source file has most likely been updated and the state of the cached file may be changed to "source" such that any read requests will be redirected to the updated source file.

In particular embodiments, the FSFD may present a merged view of the local cache and the virtual disk source volume in response query directory requests (for example, when a "dir" command is executed in a command shell). This merged view includes files and folders that do not exist on the virtual disk source volume, hides entries that were removed from the virtual disk source volume, and correctly shows paths that were renamed on the virtual disk source volume. If the FSFD intercepts a query directory request, it may first redirect the request to the local cache and collect cache structure information regarding the cached files and folders. Subsequent query directory requests may be redirected to the virtual disk source volume. The FSFD may combine the cache structure information from the virtual disk source volume with the file system structure information from the local cache into a final merged view. Combining the file system structure information from the virtual disk source volume and the cache structure information from the local cache may include the steps of excluding entries of the virtual disk source volume having a corresponding entry in the local cache and excluding entries of the source volume that have been flagged as renamed or removed.

In particular embodiments, a query directory request is intercepted by the FSFD to provide to the initiator of the query directory request a proper view of the folder structure of the directory. In one embodiment, a query directory request is received first in time before any other requests and in such an instance, the query directory request is sent directly to the local cache folder. After this initial querying of the local cache folder is complete, subsequent query directory requests are redirected to the virtual disk source volume folder. A response to this subsequent query directory request excludes all entries of the local cache folder as well as any entries of the virtual disk source volume folder that are marked as renamed or removed.

In particular embodiments, the FSFD intercepts requests to rename or delete files and folders, for example, a delete request may be a delete file request or a delete folder request and a rename request may be a rename file request or a rename folder request. These requests are intercepted to keep track of the virtual disk source volume folder structure. When the FSFD intercepts a request to rename a cached file or folder, the FSFD may rename the cached file or folder in the local cache and update the cached file or folder metadata entry. Updating the cached file or folder metadata entry may include updating the name and updating the source path. If a corresponding file or folder exists in the virtual disk source volume, the FSFD may also update the source volume metadata entry of the corresponding file or folder to indicate that the file or folder has been renamed. When the FSFD intercepts a request to delete a cached file or folder, the FSFD may remove the cached file or folder from the local cache and delete the metadata entry associated with the cached file or folder. If a corresponding file or folder exists in the virtual disk source volume, the FSFD may also update the source volume metadata entry of the corresponding file or folder to indicate that the file or folder has been removed.

Figure 4:
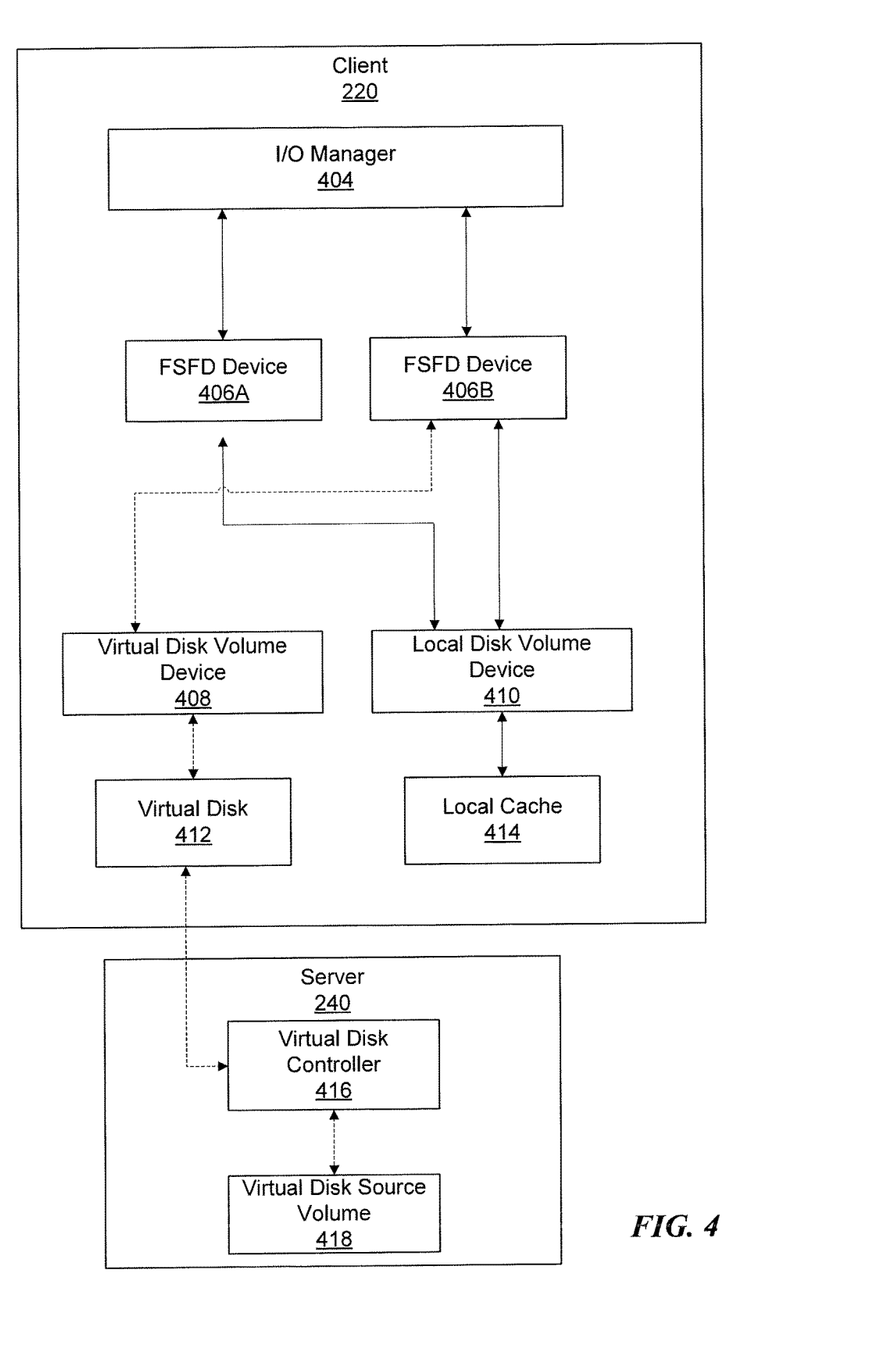
FIG. 4 is an example of a network environment having a local file-based cache.

Examples of request handling according to this disclosure are depicted in FIG. 4. FIG. 4 depicts flow of certain requests in a networked information handling systems comprising a client 220 and a server 240. Client 220 includes an I/O manager 404. FSFD devices 406A, 406B intercept I/O requests and filter or redirect requests based on the nature of the requests. For example, if the FSFD device 406A receives a create-file request, FSFD device 406A redirects the create file request to a local disk volume device 410 to create a file in local cache 414.

If one of FSFD devices 406A, 406B intercept a read or write paging request directed to a file, FSFD devices 406A, 406B determine the state of the file. If the file state is "source", the FSFD devices 406A, 406B may use a source file located in virtual disk volume device 408 to read data pages, attributes, or other data from virtual disk 412. If the file state is "split", data pages that have not yet been modified are read from the source file on virtual disk 412 and data pages that have been modified are read from the cached file in local cache 414. Write requests intercepted by FSFD devices 406A, 406B are redirected to the local cache 414. If the file state is "cache" all read and write requests are sent to local cache 414. Disk I/O requests sent to virtual disk 412 go over the network to virtual disk controller 416 on the server 240. Virtual disk controller 416 handles client requests and performs read and/or write operations to the virtual disk source volume 418, which is normally stored as a file on the server 240.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of implementing a cache in a layering environment, comprising:
    loading a file-system filter driver;
    attaching the file-system filter driver to each of a cache volume containing the cache and a source volume;
    intercepting, by the file-system filter driver, a first request from a requestor, wherein the first request comprises one of a create-file request or an open source file request;
    redirecting the first request to the cache;
    creating, in response to the first request, a cached file in a cached folder in the cache, wherein creating the cached file in response to the open source file request comprises setting size and valid data length of the cached file;
    returning a handle to the cached file to the requestor;
    intercepting, by the file-system filter driver, a delete request, wherein the delete request comprises one of deleting the cached file or deleting the cached folder;
    redirecting the delete request to the cache;
    deleting the one of the cached file or the cached folder;
    deleting a metadata entry associated with the one of the cached file or the cached folder; and
    updating source volume metadata associated with the one of the cached file or the cached folder, wherein the source volume metadata is indicative of a deletion of the one of the cached file or the cached folder.

2. The method of claim 1, further comprising:
intercepting, by the file-system filter driver, a write-file request;
redirecting the write-file request to the cache; and
updating a page bitmap with a modification status of a source file associated with the write-file request, wherein the file-system filter driver uses the page bitmap to determine how to redirect the write-file request to the cache.

3. The method of claim 1, further comprising:
intercepting, by the file-system filter driver, an open cached file request;
redirecting the open cached file request to the cache;
obtaining, in response to the open cached file request, a source path, wherein the source path comprises a location of at least one of a source file and a source folder of the source volume corresponding to the cached file; and
opening the source path.

4. The method of claim 1, further comprising:
intercepting, by the file-system filter driver, a read-file request;
redirecting the read-file request to at least one of an associated source file and the cached file;
wherein the read-file request is redirected based, at least in part, on a page bitmap; and
wherein the page bitmap is indicative of a modification status of at least one page of the associated source file.

5. The method of claim 1, further comprising
intercepting, by the file-system filter driver, a rename request, wherein the rename request comprises one of renaming the cached file or renaming the cached folder;
redirecting the rename request to the cache;
renaming the one of the cached file or the cached folder;
updating name information for a metadata entry associated with the one of the cached file or the cached folder;
saving source path metadata for the one of the cached file or the cached folder associated with the rename request; and
updating source volume metadata corresponding to the one of the cached file or the cached folder, wherein the source volume metadata is indicative of a rename of the one of the cached file or the cached folder.

6. One or more computer-readable non-transitory storage media embodying logic that is operable when executed to:
load a file-system filter driver;
attach the file-system filter driver to each of a cache volume containing the cache and a source volume;
intercept, by the file-system filter driver, a first request, wherein the first request comprises one of a create-file request or an open source file request;
redirect the first request to the cache;
create, in response to the first request of a requestor, a cached file in a cached folder in the cache, wherein creating the cached file in response to the open source file request comprises setting size and valid data length of the cached file;
return a handle to the cached file to the requestor;
intercept, by the file-system filter driver, a delete request, wherein the delete request comprises one of deleting the cached file or deleting the cached folder;
redirect the delete request to the cache;
delete the one of the cached file or the cached folder;
delete a metadata entry associated with the one of the cached file and the cached folder; and
update source volume metadata associated with the one of the cached file or the cached folder, wherein the source volume metadata is indicative of a deletion of the one of the cached file or the cached folder.

7. The one or more computer-readable non-transitory storage media of claim 6, embodying logic that is further operable when executed to:
intercept, by the file-system filter driver, a write-file request;
redirect the write-file request to the cache; and
update a page bitmap with a modification status of a source file associated with the write-file request, wherein the file-system filter driver uses the page bitmap to determine how to redirect the write-file request to the cache.

8. The one or more computer-readable non-transitory storage media of claim 6, embodying logic that is further operable when executed to:
intercept, by the file-system filter driver, an open cached file request;
redirect the open cached file request to the cache;
obtain, in response to the open cached file request, a source path, wherein the source path comprises a location of at least one of a source file or a source folder of the source volume corresponding to the cached file; and
open the source path.

9. The one or more computer-readable non-transitory storage media of claim 6, embodying logic that is further operable when executed to:
intercept, by the file-system filter driver, a read-file request; and
redirect the read-file request to at least one of an associated source file and the cached file;
wherein the read-file request is redirected based, at least in part, on a page bitmap; and
wherein the page bitmap is indicative of a modification status of at least one page of the associated source file.

10. The one or more computer-readable non-transitory storage media of claim 6, embodying logic that is further operable when executed to:
intercept, by the file-system filter driver, a rename request, wherein the rename request comprises one of renaming the cached file or renaming the cached folder;
redirect the rename request to the cache,
rename the one of the cached file or the cached folder;
update name information for a metadata entry associated with the one of the cached file or the cached folder;
save source path metadata for the one of the cached file or the cached folder associated with the rename request; and
update source volume metadata corresponding to the one of the cached file or the cached folder, wherein the source volume metadata is indicative of a rename of the one of the cached file or the cached folder.

11. The one or more computer-readable non-transitory storage media of claim 6, embodying logic that is further operable when executed to:
receive, in response to a query directory request, cache structure information from the cache and source volume structure information from the source volume corresponding to the cache; and
provide, in response to receiving the cache file structure information and source volume structure information, a merged view of the cache structure information and the source volume structure information.

12. An information handling system, comprising:
one or more processors; and a memory coupled to the processors comprising instructions executable by the processors, the processors being operable when executing the instructions to:

load a file-system filter driver;

attach the file-system filter driver to each of a cache volume containing the cache and a source volume;

intercept, by the file-system filter driver, a first request from a requestor, wherein the first request comprises one of a create-file request or an open source file request;

redirect the first request to the cache;

create, in response to the first request, a cached file in a cached folder in the cache, wherein creating the cached file in response to the open source file request comprises setting size and valid data length of the cached file;

return a handle to the cached file to the requestor;

intercept, by the file-system filter driver, a delete request, wherein the delete request comprises one of deleting the cached file or deleting the cached folder;

redirect the delete request to the cache;

delete the one of the cached file or the cached folder;

delete a metadata entry associated with the one of the cached file and the cached folder; and update source volume metadata associated with the one of the cached file or the cached folder, wherein the source volume metadata is indicative of a deletion of the one of the cached file or the cached folder.

13. The information handling system of claim 12, wherein the memory coupled to the processors further comprise instructions executable by the processors, the processors being operable when executing the instructions to:

intercept, by the file-system filter driver, a write-file request;

redirect the write-file request to the cache; and update a page bitmap with a modification status of a source file associated with the write-file request, wherein the file-system filter driver uses the page bitmap to determine how to redirect the write-file request to the cache.

14. The information handling system of claim 12, wherein the memory coupled to the processors further comprise instructions executable by the processors, the processors being operable when executing the instructions to:

intercept, by the file-system filter driver, an open cached file request;

redirect the open cached file request to the cache;

obtain, in response to the open cached file request, a source path, wherein the source path comprises a location of at least one of a source file or a source folder of the source volume corresponding to the cached file; and open the source path.

15. The information handling system of claim 12, wherein the memory coupled to the processors further comprise instructions executable by the processors, the processors being operable when executing the instructions to:

intercept, by the file-system filter driver, a read-file request; and redirect the read-file request to at least one of an associated source file and the cached file;

wherein the read-file request is redirected based, at least in part, on a page bitmap; and wherein the page bitmap is indicative of a modification status of at least one page of the associated source file.

16. The information handling system of claim 12, wherein the memory coupled to the processors further comprise instructions executable by the processors, the processors being operable when executing the instructions to:

intercept, by the file-system filter driver, a rename request, wherein the rename request comprises one of renaming the cached file or renaming the cached folder;

redirect the rename request to the cache;

rename the one of the cached file or the cached folder;

update name information for a metadata entry associated with the one of the cached file or the cached folder;

save source path metadata for the one of the cached file or the cached folder associated with the rename request; and update source volume metadata corresponding to the one of the cached file or the cached folder, wherein the source volume metadata is indicative of a rename of the at least one of the cached file or the cached folder.

17. The information handling system of claim 12, wherein the memory coupled to the processors further comprise instructions executable by the processors, the processors being operable when executing the instructions to:

receive, in response to a query directory request, cache structure information from the cache and source volume structure information from a source volume corresponding to the cache; and provide, in response to receiving the cache structure information and the source volume structure information, a merged view of the cache structure information and the source volume structure information.

* * * * *